(12) United States Patent
Kang et al.

(10) Patent No.: US 12,210,236 B2
(45) Date of Patent: Jan. 28, 2025

(54) DISPLAY APPARATUS

(71) Applicant: SAMSUNG ELECTRONICS CO., LTD., Suwon-si (KR)

(72) Inventors: Jong Hyun Kang, Suwon-si (KR); Jun Su Jung, Suwon-si (KR); Hyun Joong Chae, Suwon-si (KR); Beom Han Kim, Suwon-si (KR); Byoung Jung Kim, Suwon-si (KR); Jun Pil Oh, Suwon-si (KR); Kyo Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/716,211

(22) Filed: Apr. 8, 2022

(65) Prior Publication Data

US 2022/0229327 A1 Jul. 21, 2022

Related U.S. Application Data

(63) Continuation of application No. PCT/KR2020/005148, filed on Apr. 17, 2020.

(30) Foreign Application Priority Data

Oct. 25, 2019 (KR) .................. 10-2019-0134039

(51) Int. Cl.
*G02F 1/1333* (2006.01)
*G02F 1/1335* (2006.01)

(52) U.S. Cl.
CPC .... *G02F 1/133314* (2021.01); *G02F 1/13332* (2021.01); *G02F 1/133322* (2021.01); *G02F 1/133504* (2013.01)

(58) Field of Classification Search
CPC .......... G02F 1/133314; G02F 1/13332; G02F 1/133322; G02F 1/133504; G02F 2201/46;

(Continued)

(56) References Cited

U.S. PATENT DOCUMENTS 8,310,617 B2 11/2012 Shimizu
8,634,042 B2 1/2014 Park
(Continued)

FOREIGN PATENT DOCUMENTS

CN 106932958 A 7/2017
CN 108074483 A 5/2018
(Continued)

OTHER PUBLICATIONS

International Search Report for International Application No. PCT/KR2020/005148 dated Aug. 11, 2020.
(Continued)

*Primary Examiner* — Paisley L Wilson
*Assistant Examiner* — Agnes Dobrowolski
(74) *Attorney, Agent, or Firm* — STAAS & HALSEY LLP

(57) ABSTRACT

A display apparatus includes a rear chassis including a fastening hole, a light source module installed at the rear chassis and configured to emit light, a diffuser plate to diffuse light emitted from the light source module, a liquid crystal panel arranged in front of the diffuser plate, a front chassis arranged to cover sides of the liquid crystal panel and the diffuser plate, a middle mold to couple the diffuser plate so that the diffuser plate is arranged in front of the light source module, the middle mold including a fastening groove to align with the fastening hole, a bonding member to bond the diffuser plate to the middle mold, and a fastening member coupleable to the fastening groove by passing through the fastening hole from behind the rear chassis to couple the rear chassis to the middle mold.

14 Claims, 21 Drawing Sheets

(58) Field of Classification Search
CPC ......... G02F 2202/28; G02F 1/133317; G02F 1/133308
See application file for complete search history.

(56) References Cited

U.S. PATENT DOCUMENTS

| | | | |
|---|---|---|---|
| 10,228,589 B2 | 3/2019 | Yang | |
| 10,268,060 B2 | 4/2019 | Wang et al. | |
| 10,989,951 B2 | 4/2021 | Park et al. | |
| 2011/0051033 A1* | 3/2011 | Shimizu | G02F 1/133308 349/58 |
| 2011/0221995 A1 | 9/2011 | Park | |
| 2013/0342785 A1 | 12/2013 | Tsai et al. | |
| 2015/0049255 A1* | 2/2015 | Terashima | G02B 6/0073 348/790 |
| 2016/0195673 A1* | 7/2016 | Yoon | G02B 6/005 362/606 |
| 2016/0223867 A1* | 8/2016 | Kim | G02F 1/133608 |
| 2016/0363722 A1* | 12/2016 | Choi | G02B 6/0091 |
| 2019/0137829 A1 | 5/2019 | Kim et al. | |

FOREIGN PATENT DOCUMENTS

| | | |
|---|---|---|
| CN | 108267890 A | 7/2018 |
| EP | 2 680 063 A | 1/2014 |
| JP | 2011-47974 | 3/2011 |
| JP | 2014-6530 | 1/2014 |
| KR | 2003-0088577 | 11/2003 |
| KR | 10-2009-057788 A | 6/2009 |
| KR | 10-2010-0052056 | 5/2010 |
| KR | 10-2015-0069145 A | 6/2015 |
| KR | 10-2016-0148103 A | 12/2016 |
| KR | 10-2017-0071338 A | 6/2017 |
| KR | 10-2017-0126562 A | 11/2017 |
| KR | 10-1841572 B1 | 5/2018 |
| WO | 2016/101371 A1 | 6/2016 |

OTHER PUBLICATIONS

International Written Opinion for International Application No. PCT/KR2020/005148 dated Aug. 11, 2020.

Extended European Search Report dated Jun. 20, 2022 in European Patent Application No. 20879482.6.

Office Action dated Jun. 14, 2023 in European Patent Application No. 20 879 482.6.

Office Action dated Sep. 14, 2023 in Korean Patent Application No. 10-2019-0134039.

Office Action dated Feb. 22, 2024 for corresponding Chinese application No. 202080074292.7.

\* cited by examiner

DISPLAY APPARATUS

CROSS-REFERENCE TO RELATED APPLICATION

This application is a Continuation Application, under 35 U.S.C. § 111(a), of PCT Application No. PCT/KR2020/005148, filed on Apr. 17, 2020, which claims the priority benefit under 35 U.S.C. § 119 of Korean Application No. 10-2019-0134039, filed Oct. 25, 2019, the contents of both of which are incorporated by reference herein in their entirety.

BACKGROUND

Field

The disclosure relates to a display apparatus, and more particularly, to a display apparatus with a reduced size of bezel to enhance the aesthetic impression.

Description of Related Art

A display apparatus is a kind of output device for visually presenting data information and images, such as text or figures, including a television, various kinds of monitors, many different kinds of portable terminals (e.g., notebooks, tablet personal computers (PCs), and smart phones), etc.

The display apparatus may include a display panel for presenting a screen and a bezel arranged on edges of the display panel.

These days, display apparatuses with slim or no bezel are being developed to enhance their aesthetic impressions.

SUMMARY

In accordance with an aspect of the disclosure, a display apparatus includes a rear chassis including a fastening hole, a light source module installed at the rear chassis and configured to emit light, a diffuser plate to diffuse light emitted from the light source module, a liquid crystal panel arranged in front of the diffuser plate and configured to display an image, a front chassis arranged to cover sides of the liquid crystal panel and the diffuser plate, a middle mold to couple the diffuser plate so that the diffuser plate is arranged in front of the light source module, the middle mold including a fastening groove to align with the fastening hole of the rear chassis, a bonding member arranged between the middle mold and the diffuser plate to bond the diffuser plate to the middle mold, and a fastening member coupleable to the fastening groove of the middle mold by passing through the fastening hole of the rear chassis from behind the rear chassis to couple the rear chassis to the middle mold.

The front chassis may include a fixing hole arranged to align with the fastening hole and the fastening groove.

The display apparatus may include a first fastening hole to align with the fastening groove of the middle mold and the fixing hole of the front chassis, and a second fastening hole covered by the front chassis.

The fastening member may include a first fastening member to be coupled to the fastening groove by passing through the fixing hole and the first fastening hole to couple the front chassis and rear chassis to the middle mold, and a second fastening member to be coupled to the fastening groove by passing through the second fastening hole to couple the rear chassis to the middle mold.

The fastening member may include a fastening portion arranged to be inserted and coupled to the fastening groove, and a head portion having a diameter larger than a diameter of the fastening groove.

The first fastening member may include a first head portion.

The first head portion may be arranged on the outside of the front chassis.

The second fastening member may include a second head portion.

The second head portion may be arranged between the rear chassis and the front chassis and covered by the front chassis.

The front chassis may be decoupled from the display apparatus by separating the first fastening member from the middle mold.

The rear chassis and the light source module installed at the rear chassis may be decoupled from the display apparatus by detaching the first fastening member from the middle mold and detaching the second fastening member from the middle mold.

The display apparatus may further include a chassis bonding member arranged between the front chassis and the middle mold to bond the front chassis to the middle mold.

The rear chassis and the light source module installed at the rear chassis may be decoupled from the display apparatus by detaching the fastening member from the middle mold.

The display apparatus may further include a panel bonding member arranged between the liquid crystal panel and the middle mold to bond the liquid crystal panel to the middle mold.

The panel bonding member may include ultraviolet (UV) resin applied in a liquid state and hardened by a UV ray.

Outermost sides of the middle mold may be coplanar with sides of the liquid crystal panel, or located father inside than the sides of the liquid crystal panel.

In accordance with an aspect of the disclosure, a display apparatus includes a rear chassis including a fastening hole, a light source module installed at the rear chassis and configured to emit light, a diffuser plate for diffusing light emitted from the light source module, a liquid crystal panel arranged in front of the diffuser plate and configured to display an image, a front chassis arranged to cover sides of the liquid crystal panel and the diffuser plate, a middle mold to fix the diffuser plate and the liquid crystal panel so that the diffuser plate is arranged in front of the light source module, the middle mold including a fastening groove to align with the fastening hole, a first bonding member arranged between the middle mold and the diffuser plate to bond the diffuser plate to the middle mold, a second bonding member arranged between the middle mold and the liquid crystal panel to bond the liquid crystal panel to the middle mold, a fastening member coupled to the fastening groove by passing through the fastening hole from behind the rear chassis to fasten the rear chassis to the middle mold.

The front chassis, the rear chassis and the light source module installed at the rear chassis may be decoupled from the display apparatus by detaching the fastening member from the middle mold in the rear of the display apparatus.

The front chassis may include a fixing hole arranged to align with the fastening hole and the fastening groove.

The fastening hole may include a first fastening hole that aligns with the fastening groove and the fixing hole, and a second fastening hole covered by the front chassis.

The fastening member may include a first fastening member coupled to the fastening groove by passing through the fixing hole and the first fastening hole to fix the front chassis and rear chassis to the middle mold, and a second fastening member coupled to the fastening groove by passing through the second fastening hole to couple the rear chassis to the middle mold.

The first fastening member may include a first head portion arranged outside of the front chassis.

The second fastening member may include a second head portion arranged between the rear chassis and the front chassis and covered by the front chassis.

In accordance with an aspect of the disclosure, a display apparatus includes a rear chassis including a fastening hole, a light source module installed at the rear chassis and configured to emit light, a diffuser plate for diffusing light emitted from the light source module, a liquid crystal panel arranged in front of the diffuser plate and configured to display an image, a front chassis arranged to cover sides of the liquid crystal panel and the diffuser plate, a middle mold to fix the diffuser plate so that the diffuser plate is arranged in front of the light source module, the middle mold including a fastening groove to align with the fastening hole; a first bonding member arranged between the middle mold and the diffuser plate to bond the diffuser plate to the middle mold, a second bonding member arranged between the middle mold and the front chassis to bond the front chassis to the middle mold, and a fastening member to be coupled to the fastening groove by passing through the fastening hole from behind the rear chassis to couple the rear chassis to the middle mold.

Additional aspects of the disclosure will be set forth in part in the description which follows and, in part, will be obvious from the description, or may be learned by practice of the disclosure.

DETAILED DESCRIPTION

Embodiments and features as described and illustrated in the disclosure are merely examples, and there may be various modifications replacing the embodiments and drawings at the time of filing this application.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure.

According to an embodiment, the disclosure provides a display apparatus with a reduced size of bezel to enhance the aesthetic impression.

According to an embodiment, the disclosure also provides a display apparatus with reduced thickness from front to back to enhance the aesthetic impression.

The disclosure, according to an embodiment, also provides a display apparatus with a light source module detachable from behind the display apparatus.

While a display apparatus with a reduced size of bezel to enhance the aesthetic impression, a display apparatus with reduced thickness from front to back may be provided to enhance the aesthetic impression, and a display apparatus with a light source module detachable from behind the display apparatus are mentioned, these features are merely examples.

Figure 1:
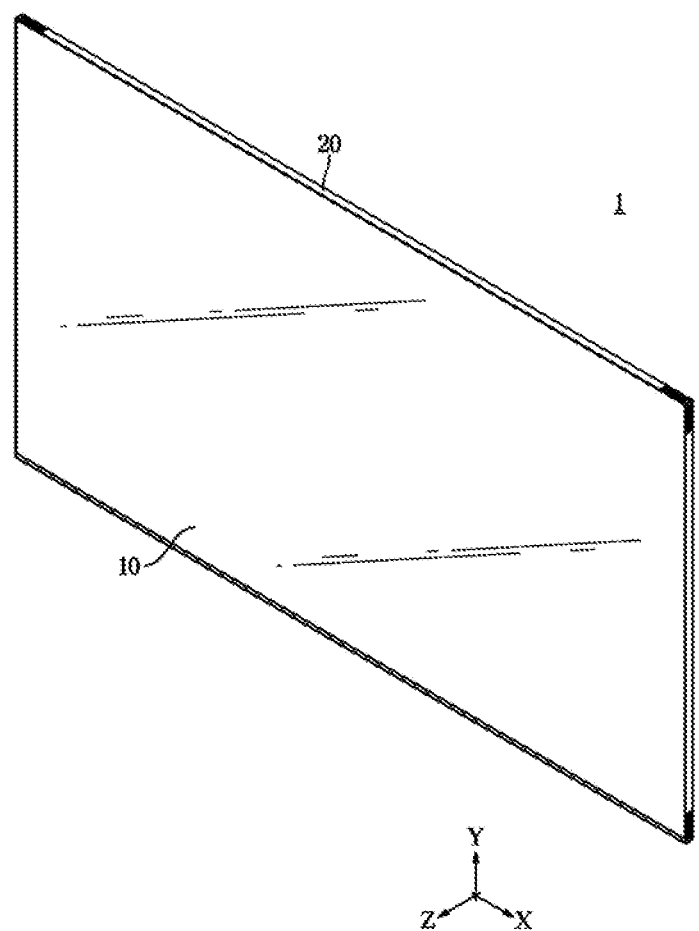
FIG. 1 illustrates an exterior of a display apparatus, according to an embodiment of the disclosure.

Directions "front", "back (or rear)", "top", "bottom", "left", and "right" will be defined throughout the specification with respect to the directions shown in FIG. 1. In FIG. 1, X-, Y-, and Z-axes perpendicular to one another are shown, where the X-axis represents a left-to-right direction, the Y-axis represents a vertical direction, and the Z-axis represents a front-to-back direction.

Reference will now be made in detail to embodiments of the disclosure with reference to accompanying drawings.

Figure 2:
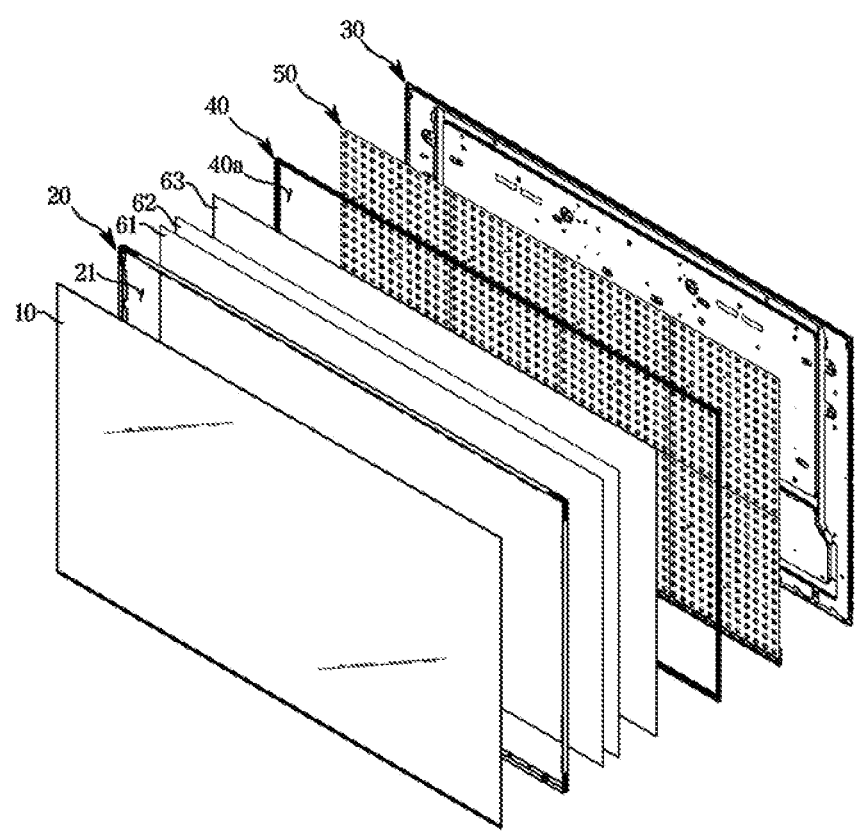
FIG. 2 is an exploded view of a major structure of a display apparatus, according to an embodiment of the disclosure.
Figure 3:
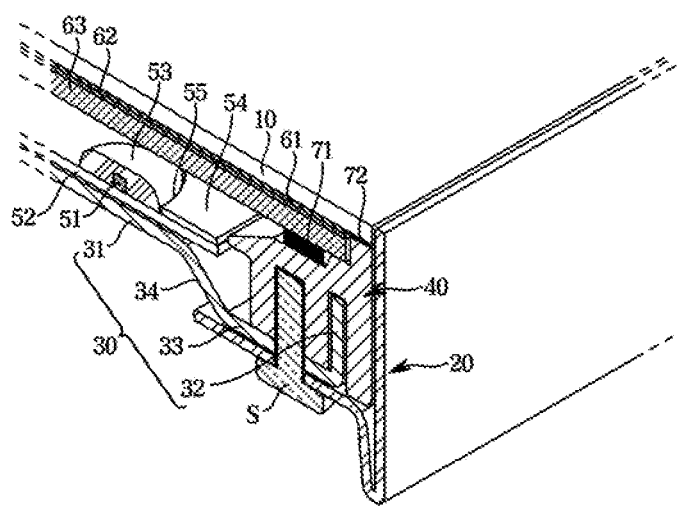
FIG. 3 is a cross-sectional view of a display apparatus, according to an embodiment of the disclosure.
Figure 4:
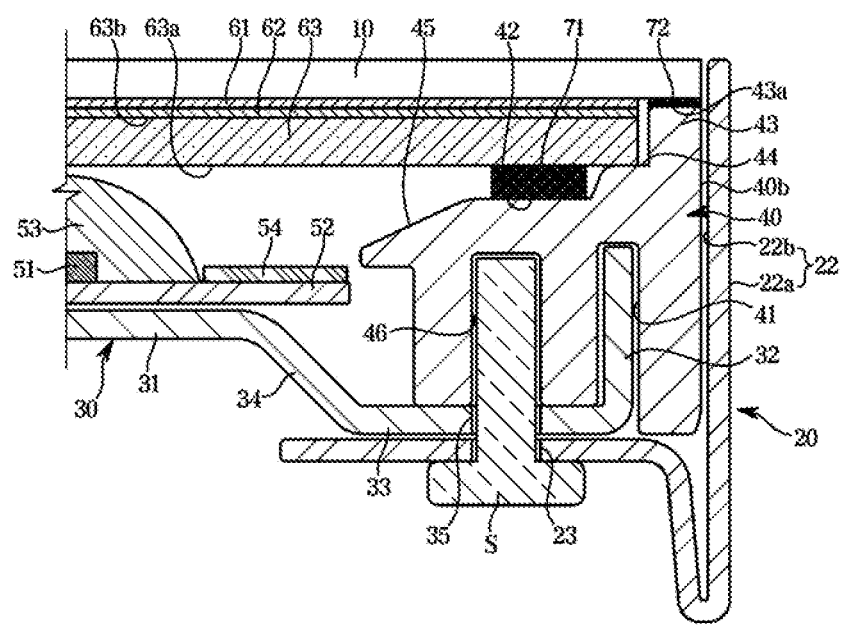
FIG. 4 is a side cross-sectional view of a display apparatus, according to an embodiment of the disclosure.

FIG. 1 illustrates an exterior of a display apparatus, according to an embodiment of the disclosure. FIG. 2 is an exploded view of a major structure of a display apparatus, according to an embodiment of the disclosure. FIG. 3 is a cross-sectional view of a display apparatus, according to an embodiment of the disclosure. FIG. 4 is a side cross-sectional view of a display apparatus, according to an embodiment of the disclosure.

Referring to FIGS. 1 to 4, a display apparatus according to an embodiment of the disclosure will now be described.

A display apparatus 1 may include a liquid crystal panel 10 for displaying an image, a backlight unit arranged behind the liquid crystal panel 10 to provide light to the liquid crystal panel 10, a rear chassis 30 for supporting the backlight unit, a front chassis 20 for covering edges of the liquid crystal panel 10, and a middle mold 40 coupled between the front chassis 20 and the rear chassis 30.

The display panel 10 may include a thin-film transistor substrate with thin-film transistors arranged thereon in the form of a matrix, a color-filter substrate coupled in parallel with the thin-film transistor substrate, and liquid crystal injected between the thin-film transistor substrate and the color-filter substrate and having optical properties that vary by changes in voltage or temperature.

The backlight unit may be arranged behind the liquid crystal panel 10 to illuminate the liquid crystal panel 10. The backlight unit may include a light source module 50 including a light source 51 and a substrate 52 with the light source 51 mounted thereon, and an optical member arranged in a traveling path of the light emitted from the light source 51.

In an embodiment of the disclosure, a plurality of substrates 52 may be provided in the form of plates. It is not, however, limited thereto, but the substrates 252 may have the form of bars.

The size and/or number of light source modules 50 may depend on the size of the display apparatus 1. In an embodiment of the disclosure, there may be eight light source modules 50, and the size of the eight light source modules 50 combined may be equal to the size of the liquid crystal panel 10.

A driving power line may be formed on the substrate 52 to supply driving power to the light source 51 and connected to a signal cable (not shown) and a backlight driving circuit (not shown).

A plurality of light sources 51 may be mounted on each of the plurality of substrates 52 with certain gaps. The light source 51 may include light emitting diodes (LEDs). Alternatively, the light source 51 may include a cold cathode fluorescent lamp (CCFL) or an external electrode fluorescent lamp (EEFL).

In the embodiment of the disclosure, a plurality of lenses 53 may be mounted on the substrate 52 to cover the respective light sources 51. The lens 53 may cover the light source 51 to diffuse light emitted from the light source 51.

A reflector sheet 54 may be provided for each of the plurality of substrates 52. The reflector sheet 54 may have the size corresponding to the substrate 52. The reflector sheet 54 may stick to a mounting surface of the substrate 52 on which the light source 51 is mounted. In other words, the reflector sheet 54 may be placed on the upper surface of the substrate 52. The reflector sheet 54 may have a through hole 55 formed for the light source 51 and the lens 53 to pass through.

The reflector sheet 54 may reflect light to prevent losses of light. Specifically, the reflector sheet 54 may reflect light emitted from the light source 51 or light reflecting backward from a diffuser plate 63 to the rear surface 63a of the diffuser plate 63. The reflector sheet 54 may prevent losses of light emitted from the light source 51 by hindering the light emitted from the light source 51 from traveling to the back of the display apparatus 1.

The backlight unit may include optical members 61, 62, and 63 arranged along the traveling path of light emitted from the light source 51.

The optical members 61, 62, and 63 may include a diffuser plate 63 for uniformly diffusing uneven light emitted from the light source 51, and first and second optical sheets 61 and 62 for enhancing properties of light.

The diffuser plate 63 may uniformly diffuse the uneven light generated from the light sources 51. The diffuser plate 63 may uniformly diffuse the light incident on the rear surface 63a to be output to the front surface 63b.

The first and second optical sheets 61 and 62 may be arranged in front of the diffuser plate 63 to enhance optical properties of the light output from the diffuser plate 63. Although the first and second optical sheets 61 and 62 are shown in the drawings, the number of optical sheets may be more or less than 2.

The first and second optical sheets 61 and 62 may include a diffuser sheet for offsetting a pattern of the diffuser plate 63, a prism sheet for concentrating the light to enhance brightness, a protection sheet for protecting the other optical sheets against an external shock or inflow of foreign materials, a reflective polarizing sheet (e.g., dual brightness enhancement film (DBEF)) for transmitting polarized light while reflecting differently polarized light to enhance brightness, a complex sheet for uniformly diffusing light, a quantum dot sheet for changing wavelengths of light to improve color reproductivity, etc. Quantum dots, which are illuminant semiconductor crystals in a few nanometers, may be distributed inside the quantum dot sheet. The quantum dot may receive blue light to produce any colors of visible light depending on the size of the quantum dot. The smaller the quantum dot is, the shorter wavelength of light may be produced, and the larger the quantum dot is, the longer wavelength of light may be produced.

In the embodiment of the disclosure, the first and second optical sheets 61 and 62 and the diffuser plate 63 may be provided in one body. Bonding members may be provided between the first and second optical sheets 61 and 62 and between the second optical sheet 62 and the diffuser plate 63, integrating the first and second optical sheets 61 and 62 and the diffuser plate 63 into one body like a single sheet.

The rear chassis 30 may be arranged behind the backlight unit. In the embodiment of the disclosure, the rear chassis 30 may be shaped substantially like a plate with the edges bending forward. The backlight unit may be accommodated between the rear chassis 30 and the liquid crystal panel 10 and front chassis 20.

The rear chassis 30 may include a base 31 on which the light source module 50 is installed, and a bent portion 32 formed on the top, bottom, left and right edges of the rear chassis 30 to be coupled with the middle mold 40.

The base 31 may contact the substrate 52 to radiate heat generated from a heating element such as the light source 51 mounted on the substrate 52. For this, the rear chassis 30 including the base 31 may be formed with, but not exclusively to, various metal substances such as aluminum, steel use stainless (SUS), etc., with high heat transfer efficiency. The rear chassis 30 may be formed with a plastic material such as ABS.

The bent portion 32 may be inserted to an insertion groove 41 formed at the middle mold 40. When the bent portion 32 is inserted to the insertion groove 41, the rear chassis 30 and the middle mold 40 may be primarily coupled to each other.

The rear chassis 30 may further include a middle mold supporter 33 for supporting the middle mold 40, and a link 34 connecting the middle mold supporter 33 to the base 31.

The middle mold supporter 33 may be formed between the bent portion 32 and the base 31 to support the middle mold 40. The link 34 may be provided to connect the middle mold supporter 33 and the base 31. The link 34 may slantingly extend backward from an end of the base 31 to connect to an end of the middle mold supporter 33. The bent portion 32 may be formed at the other end of the middle mold supporter 33.

The light source module 50 may be placed between the base 31 and the diffuser plate 63, and the middle mold 40 may be placed between the middle mold supporter 33 and the diffuser plate and liquid crystal panel 10. A distance between the base 31 and the liquid crystal panel 10 may be shorter than a distance between the middle mold supporter 33 and the liquid crystal panel 10.

The front chassis 20 may be shaped like a frame with an opening 21 for the light from the backlight unit to be provided to the liquid crystal panel 10. The front chassis 20 may be provided to cover the sides of the liquid crystal panel 10 and the middle mold 40.

For the conventional display apparatus, the front chassis supports the liquid crystal panel by covering the front edges of the liquid crystal panel. Edges around the liquid crystal panel defined by the front chassis is called a bezel, and the bezel causes the size of a screen display area of the liquid crystal panel to be reduced. Furthermore, a thick bezel causes an aesthetic impression on the display apparatus to get worse.

According to the disclosure, the front chassis 20 may be provided to cover the sides of the liquid crystal panel 10 but not to cover the front of the liquid crystal panel 10. As the front chassis 20 does not cover the screen display area of the liquid crystal panel 10, the size of the screen display area of the liquid crystal panel 10 does not shrink from the front chassis 20. Accordingly, the size of the screen display area of the liquid crystal panel 10 of the display apparatus 1 may be enlarged.

Furthermore, according to the disclosure, thickness of the front chassis 20 in the left-right direction may be reduced. The thickness of the front chassis 20 in the left-right direction may indicate the size of the bezel. The front chassis 20 has a structure to perform a function of covering the sides of the liquid crystal panel 10 and the middle mold 40, which may be performed even without having thick thickness of the front chassis 20. Accordingly, in the embodiment of the disclosure, the display apparatus 1 may have a bezel with a reduced size, and thus have an enhanced aesthetic impression.

Similar to the front chassis 20, the middle mold 40 may be shaped like a frame with an opening 40a for the light from the backlight unit to be provided to the liquid crystal panel 10. The middle mold 40 may be coupled to the rear chassis 30 and the front chassis 20. The middle mold 40 may fix the diffuser plate 63 and the first and second optical sheets 61 and 62. Furthermore, the middle mold 40 may fix the liquid crystal panel 10.

The middle mold 40 may be placed on the middle mold supporter 33 of the rear chassis 30. The middle mold 40 may include the insertion groove 41 for the bent portion 32 of the rear chassis 30 to be inserted thereto. As described above, as the bent portion 32 is inserted to the insertion groove 41, the middle mold 40 and the rear chassis 30 may be primarily coupled to each other.

The middle mold 40 may fix the diffuser plate 63. The middle mold 40 may include a sheet bonding surface 42. The sheet bonding surface 42 is a surface of the middle mold 40 facing the diffuser plate 63 at a certain distance from the diffuser plate 63.

A first bonding member 71 may be provided between the sheet bonding surface 42 and the diffuser plate 63. The first bonding member 71 may be made with a transparent substance. For example, the first bonding member 71 may include a pressure sensitive adhesive (PSA) having more than 90% of light transmittance. With the first bonding member 71 made with a material having high light transmittance, light emitted from the light source module 50 may pass through the first bonding member 71 and enter into the diffuser plate 63. This may prevent losses of light.

The first bonding member 71 may be provided to bond the sheet bonding surface 42 of the middle mold 40 and the rear surface 63a of the diffuser plate 63. With the first bonding member 71, the optical members 61, 62, and 63 may be coupled to the middle mold 40 without an extra structure.

In the conventional display apparatus, an extra structure is provided to support the optical sheets. The structure presses the optical sheets to prevent them from being decoupled, but causes the display apparatus to be thick and further the bezel to be thick.

According to the embodiment of the disclosure, the optical members 61, 62, and 63 may be coupled to the middle mold 40 by the first bonding member 71 without an extra structure. Accordingly, the display apparatus may become slim and the bezel size may also be reduced.

In the embodiment of the disclosure, the middle mold 40 may be coupled to the liquid crystal panel 10 to prevent the liquid crystal panel 10 from falling out forward from the display apparatus 1. The middle mold 40 may include the supporting projection 43 protruding toward the liquid crystal panel 10. The supporting projection 43 may include a panel bonding surface 43a facing the rear surface of the liquid crystal panel 10. The second bonding member 72 may be provided between the panel bonding surface 43a and the rear surface of the liquid crystal panel 10. The second bonding member 72 may be provided to bond the panel bonding surface 43a of the middle mold 40 and the rear surface of the liquid crystal panel 10. With the second bonding member 72, the liquid crystal panel 10 may be fixedly coupled to the middle mold 40.

In the embodiment of the disclosure, as described above, the liquid crystal panel 10 may be fixed to the middle mold 40 by adhesive power of the second bonding member 72. The liquid crystal panel 10 may be decoupled from the middle mold 40 when the adhesive power of the second bonding member 72 becomes weak, so that strong adhesive power of the second bonding member is required to support the liquid crystal panel 10. To meet this requirement, the second bonding member 72 may include ultraviolet (UV) resin. When the second bonding member 72 is the UV resin, the second bonding member 72 may be applied in a liquid state on the panel bonding surface 43a and hardened by UV rays, thereby bonding the panel bonding surface 43a to the rear surface of the liquid crystal panel 10.

The middle mold 40 may also include a sheet supporting plane 44 arranged between the supporting projection 43 and the sheet bonding surface 42. The sheet supporting plane 44 may protrude almost as much as the thickness of the first bonding member 71 from the sheet bonding surface 42 to the diffuser plate 63. The sheet supporting plane 44 may be provided to contact and support the diffuser plate 63. The supporting projection 43 may protrude toward the liquid crystal panel 10 from the sheet supporting plane 44. Alternatively, the sheet supporting plane 44 may not contact the diffuser 63 or may be omitted. When the sheet supporting plane 44 is omitted, the supporting projection 43 may be formed by protruding from the sheet bonding surface 42.

In the embodiment of the disclosure, the middle mold 40 may include a light guide plane 45. The light guide plane 45 may guide light generated from the light source 51 to enter into the diffuser plate 63. Specifically, the light guide plane 45 may guide the light generated from the light source 51 to enter into the first bonding member 71 or to a surface of the diffuser plate 63 that comes into contact with the first bonding member 71. The light guide plane 45 may be inclined not to interfere with the traveling path of the light. The light guide plane 45 may prevent the middle mold 40 from interfering with the traveling path of light generated from the light source 51 when the light passes through the lens 53 and enters into the diffuser plate 63. The inclination angle of the light guide plane 45 may be determined by taking into account properties of the light. The inclination angle of the light guide plane 45 may be determined by taking into account a profile of the light.

Otherwise, when the light guide plane 45 is not provided or the sheet bonding surface 42 extends up to the substrate 52, light generated from the light source 51 and traveling toward the first bonding member 71 may be blocked by the middle mold 40 in the traveling path. When the light is blocked in the traveling path and fails to reach a portion where the first bonding member 71 is placed, brightness of the liquid crystal panel 10 in the portion where the first bonding member 71 is placed is degraded or uneven. The light guide plane 45 provides a traveling path for light to allow the light to reach a location where the first bonding member 71 is placed. Accordingly, in the embodiment of the disclosure, the display apparatus 1 may prevent degradation or unevenness of brightness of the liquid crystal panel 10.

The middle mold 40 may be arranged not to protrude sideways from the liquid crystal panel 10. In other words, an outermost side 40b of the middle mold 40 may be coplanar with a side 10a of the liquid crystal panel 10, or located farther inside than the side 10a of the liquid crystal panel 10. Although the side 40b of the middle mold 40 is shown as being coplanar with the side 10a of the liquid crystal panel 10, it may be located farther inside than the side 10a of the liquid crystal panel 40.

A side 22 of the front chassis 20 may be arranged to cover sides of the liquid crystal panel 40 and the middle mold 10. The side 22 of the front chassis 20 may include an inner side surface 22a facing the side 40b of the middle mold 40 and an outer side surface 22b opposite to the inner side surface 22a. According to the disclosure, the inner side surface 22a and the outer side surface 22b may be provided in parallel and may extend in an almost straight line along the front-back direction. A distance between the inner and outer side surfaces 22a and 22b of the front chassis 20 corresponds to the size of the bezel of the display apparatus. According to the disclosure, the inner and outer side surfaces 22a and 22b of the front chassis 20 do not protrude sideways but extend in an almost straight line along the front-back direction, so the size of the bezel may be very thin.

In the conventional display, the middle mold is provided to protrude outwards from the liquid crystal panel, and the front chassis is provided to cover the middle mold protruding sideways from the liquid crystal panel. As the front chassis covers the middle mold, the size of the bezel defined by the front chassis is larger than the portion of the middle mold protruding outwards from the liquid crystal panel. That is, the conventional display has a limitation on reducing the size of the bezel because the middle mold protrudes outwards from the liquid crystal panel.

On the contrary, according to the embodiment of the disclosure, the middle mold 40 may be provided without such a portion that protrudes outwards from the liquid crystal panel 10. The front chassis 20 may be arranged very closely to the sides of the liquid crystal panel 10 because there is no portion protruding outwards from the liquid crystal panel 10. Furthermore, the front chassis 20 has a structure of covering the sides of the liquid crystal panel 10 and the sides of the middle mold 40, it may perform the function of covering the sides without difficulty even when the thickness become thinner. Accordingly, the thickness of the side 22 of the front chassis 20 may be provided to be very thin. As the size of the bezel is proportional to the thickness of the side 22 of the front chassis 20, the size of the bezel of the display apparatus 1 may be reduced by minimizing the thickness of the side 22 of the front chassis. With the reduced size of the bezel, the display apparatus 1 may give an enhanced aesthetic impression.

In the embodiment of the disclosure, the front chassis 20, the rear chassis 30, and the middle mold 40 may be combined by a fastening member S that is provided separately. The middle mold 40 may include a fastening groove 46 into which the fastening member S is inserted and coupled. The rear chassis 30 may include a first fastening hole 35 formed to correspond to the fastening groove 46 and for the fastening member S to pass through. The front chassis 20 may include a second fastening hole 23 formed to correspond to the fastening groove 46 and the first fastening hole 35 and for the fastening member S to pass through.

The fastening member S may pass through the first and second fastening holes 35 and 23 and may be fastened into the fastening groove 46. In an embodiment of the disclosure, the fastening member S may be screwed into the fastening groove 46. When the fastening member S is fastened into the fastening groove 46, the front chassis 20 may be fixedly coupled to the rear chassis 30. Furthermore, when the fastening member S is fastened into the fastening groove 46, the rear chassis 30 and the middle mold 40 may be secondarily coupled to each other.

Figure 5:
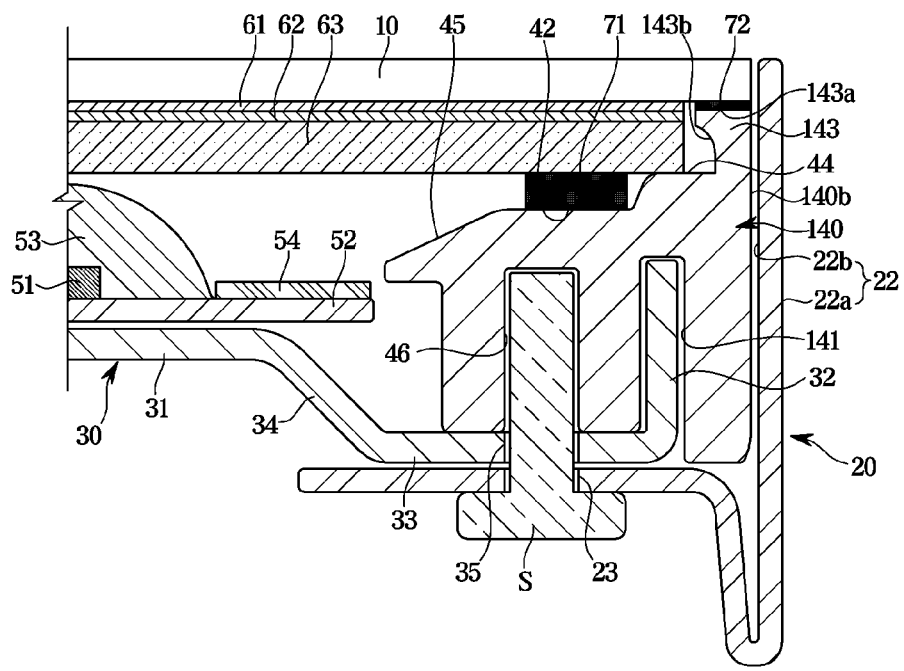
FIG. 5 is a side cross-sectional view of a display apparatus, according to another embodiment of the disclosure.

FIG. 5 is a side cross-sectional view of a display apparatus, according to another embodiment of the disclosure.

In the embodiment of the disclosure, a display apparatus may include a liquid crystal panel 10, a backlight unit arranged behind the liquid crystal panel 10 to provide light to the liquid crystal panel 10, a rear chassis 30 for supporting the backlight unit, a front chassis 20 for covering edges of the liquid crystal panel 10, and a middle mold 140 coupled between the front chassis 20 and the rear chassis 30.

The structure except for the middle mold 140 is equal to that of the previous embodiment as described above, so the overlapping description will not be repeated.

The middle mold 140 may include a supporting projection 143. The supporting projection 143 may include a panel bonding surface 143a facing the rear surface of the liquid crystal panel 10. The second bonding member 72 may be provided between the panel bonding surface 143a and the rear surface of the liquid crystal panel 10.

In the embodiment of the disclosure, the supporting projection 143 may further include a light reflecting plane 143b. The light reflecting plane 143b may be provided to reflect the light emitted from the light source 51. The light reflecting plane 143b may be formed to be sunken from a surface of the supporting projection 143. Specifically, it may be formed by being sunken from a surface of the supporting projection 143 facing the side of the diffuser plate 63. The light reflecting plane 143b may be formed as a curved plane to uniformly reflect light. The light reflecting plane 143b may be a smoothly curved plane without angulation. The light reflecting plane 143b may be formed to be sunken toward the side of the diffuser plate 63.

The light reflecting plane 143b may prevent portions of the edges of the liquid crystal panel 10 from having excessively high brightness. The light reflecting plane 143b may reduce an amount of light emitted through the edges of the liquid crystal panel 10 by reflecting the light backward. This may prevent relative increase of brightness of the portions of the edges of the liquid crystal panel 10, and accordingly, the liquid crystal panel 10 may have uniform brightness across the entire area.

Figure 6:
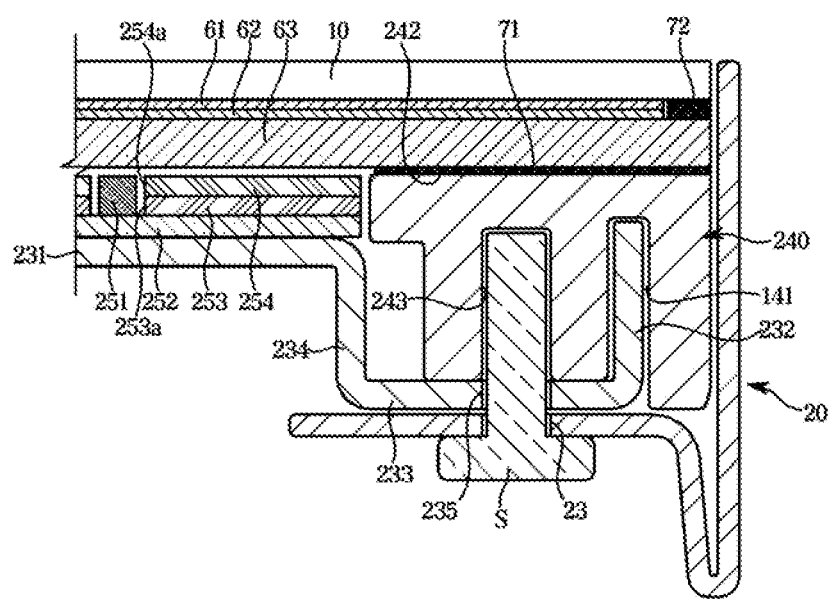
FIG. 6 is a side cross-sectional view of a display apparatus, according to another embodiment of the disclosure.

FIG. 6 is a side cross-sectional view of a display apparatus, according to another embodiment of the disclosure.

In the embodiment of the disclosure, a display apparatus may include a liquid crystal panel 10, a backlight unit arranged behind the liquid crystal panel 10 to provide light to the liquid crystal panel 10, a rear chassis 230 for supporting the backlight unit, a front chassis 20 for covering edges of the liquid crystal panel 10, and a middle mold 240 coupled between the front chassis 20 and the rear chassis 230.

The backlight unit may be arranged behind the liquid crystal panel 10 to illuminate the liquid crystal panel 10. The backlight unit may include a light source module 250 including a light source 251 and a substrate 252 with the light source 251 mounted thereon, and an optical member arranged in a traveling path of the light emitted from the light source 251.

In the embodiment of the disclosure, the light source module 250 may include a plurality of substrates 252 in the form of plates. It is not, however, limited thereto, but the substrates 252 may have the form of bars.

The size and/or number of light source modules 250 may be different depending on the size of the display apparatus. In the embodiment of the disclosure, there may be eight light source modules 250, and the size of the eight light source modules 250 combined may be equal to the size of the liquid crystal panel 10.

A plurality of light sources 251 may be mounted on each of the plurality of substrates 252 with certain gaps. The light source 251 may include light emitting diodes (LEDs). A reflector sheet 253 may be placed on the substrate 252. The reflector sheet 253 may reflect light to prevent losses of light. The reflector sheet 253 may include a plurality of through holes 253a for the plurality of light sources 251 to pass through. A light guide film 254 may be placed on the reflector sheet 253. The light guide film 254 may diffuse and guide light generated from the light source 251 to the front. The light guide film 254 may make the light sources 251 from point light sources to a surface light source. Similar to the reflector sheet 253, the light guide film 254 may also include a plurality of through holes 254a.

In the embodiment of the disclosure, the light source module 250 may not include a lens. Accordingly, a least distance required between the light source and the diffuser plate may be reduced as compared with an occasion when the lens is provided. Furthermore, a distance between a base 231 of the rear chassis 230 and the liquid crystal panel 10 may be reduced. With the reduced distance between the base 231 and the liquid crystal panel 10, thickness of the display apparatus from front to back may be reduced. With the reduced thickness of the display apparatus, the display apparatus may give an enhanced aesthetic impression.

In the embodiment of the disclosure, a link 234 of the rear chassis may be provided to be almost perpendicular to the base 231 and a middle mold supporter 233. A bent portion 232 may be inserted to an insertion groove 141 of the middle mold 240.

In the embodiment of the disclosure, the middle mold 240 may include the sheet bonding surface 242. No projection may be provided on the sheet bonding surface 242. The first bonding member 71 may be provided between the sheet bonding surface 242 and the rear surface 63a of the diffuser plate 63. The first bonding member 71 may couple the middle mold 240 to the diffuser plate 63 by bonding the sheet bonding surface 242 and the rear surface 63a of the diffuser plate 63. The first bonding member 71 may include a pressure sensitive bonding member (PSA) or an optical clear bonding member (OCA).

In the embodiment of the disclosure, the liquid crystal panel 10 may be fixedly coupled to the diffuser plate 63. The second bonding member 72 may be provided between the liquid crystal panel 10 and the diffuser plate 63 to bond the liquid crystal panel 10 and the diffuser plate 63. Accordingly, the liquid crystal panel 10 may be fixedly coupled to the diffuser plate 63. The second bonding member 72 may include UV resin.

Although not shown, the liquid crystal panel 10 may be coupled to the first optical sheet 61. In this case, the second bonding member 72 may be arranged between the liquid crystal panel 10 and the first optical sheet 61.

In the embodiment of the disclosure, the liquid crystal panel 10 and the diffuser plate 63 may be coupled by the second bonding member 72 without an extra structure.

In the conventional display, an bonding member may be provided on a structure arranged at e.g., the front chassis to couple the liquid crystal panel to the front chassis. In such a method, it is difficult to form a liquid crystal panel supporting structure corresponding to the size of a black material (BM) of the ever decreasing liquid crystal panel.

In the embodiment of the disclosure, the second bonding member 72 may be placed in a size corresponding to the BM of the liquid crystal panel. Accordingly, even when the BM of the liquid crystal panel becomes smaller, the liquid crystal panel 10 may be stably coupled to the diffuser plate 63 or the first optical sheet 61 accordingly.

Figure 7:
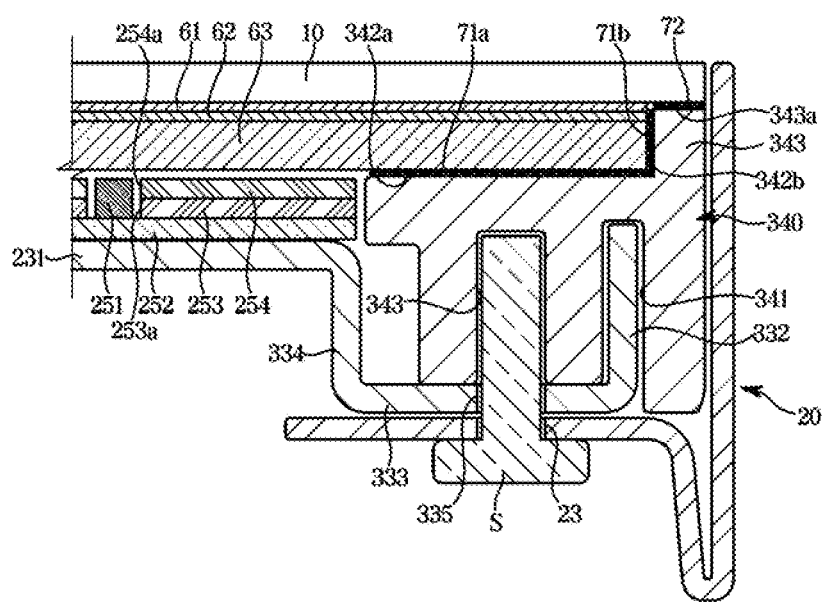
FIG. 7 is a side cross-sectional view of a display apparatus, according to another embodiment of the disclosure.

FIG. 7 is a side cross-sectional view of a display apparatus, according to another embodiment of the disclosure.

In the embodiment of the disclosure, the liquid crystal panel 10 may be fixedly coupled to a middle mold 340.

The middle mold 340 may include the supporting projection 343 protruding toward the liquid crystal panel 10. The supporting projection 343 may include a panel bonding surface 343a facing the rear surface of the liquid crystal panel 10. The second bonding member 72 may be provided between the panel bonding surface 343a and the rear surface of the liquid crystal panel 10. The second bonding member 72 may be provided to bond the panel bonding surface 343a of the middle mold 340 and the rear surface of the liquid crystal panel 10. With the second bonding member 72, the liquid crystal panel 10 may be fixedly coupled to the middle mold 340. The second bonding member 72 may include UV resin.

In the embodiment of the disclosure, the middle mold 340 may include the first sheet bonding surface 342a and the second sheet bonding surface 342b.

The first bonding surface 342a may be arranged to face the rear surface 63a of the diffuser plate 63, and an bonding member 1a 71*a* may be placed between the first sheet bonding surface 342*a* and the rear surface 63*a* of the diffuser plate 63 (see FIG. 4).

The second sheet bonding surface 342*b* may be arranged to face the side of the diffuser plate 63. An bonding member 1b 71*b* may be provided between the second sheet bonding surface 342 and the side of the diffuser plate 63.

The bonding member 1a 71*a* and the bonding member 1b 71*b* may include an PSA and an OCA.

In the embodiment of the disclosure, the sheet bonding surface may be double-sided to relatively strengthen adhesive power between the diffuser plate and the middle mold. Accordingly, the diffuser plate and the middle mold may be more stably coupled.

Figure 8:
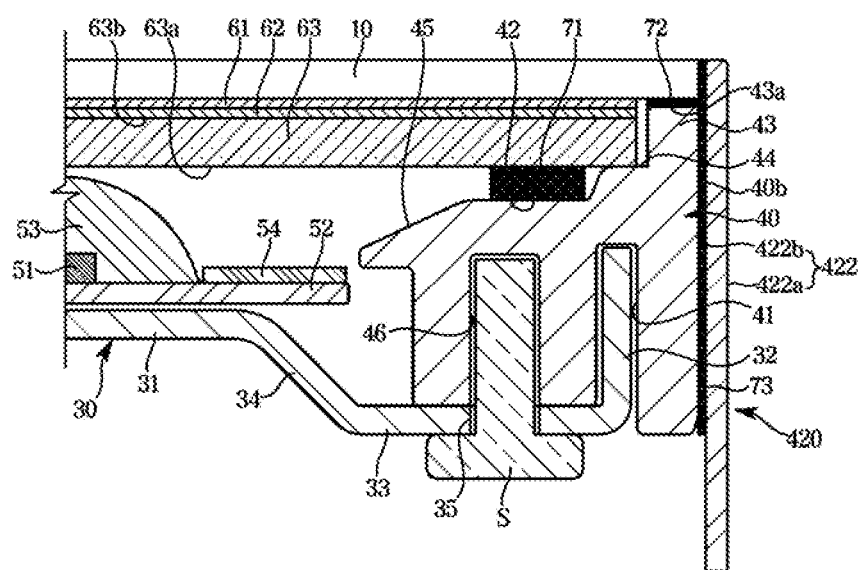
FIG. 8 is a side cross-sectional view of a display apparatus, according to another embodiment of the disclosure.

FIG. 8 is a side cross-sectional view of a display apparatus, according to another embodiment of the disclosure.

In the embodiment of the disclosure, a display apparatus may include a liquid crystal panel 10 for displaying an image, a backlight unit arranged behind the liquid crystal panel 10 to provide light to the liquid crystal panel 10, a rear chassis 30 for supporting the backlight unit, a front chassis 420 for covering edges of the liquid crystal panel 10, and a middle mold 40 coupled between the front chassis 420 and the rear chassis 30.

In the embodiment of the disclosure, all the components but the front chassis 420 are the same as those shown in FIG. 4, so the overlapping description will not be repeated.

In the embodiment of the disclosure, the front chassis 420 may be provided to cover the sides of the liquid crystal panel 10 and the middle mold 40.

The front chassis 420 may be fixedly coupled to the sides of the liquid crystal panel 10. Furthermore, the front chassis 420 may be fixedly coupled to the sides of the middle mold 40.

A gap may be formed between the front chassis 420 and the liquid crystal panel 10, and similarly, there may be a gap formed between the front chassis 420 and the middle mold 40. A third bonding member 73 may be provided in the gap.

The third bonding member 73 may bond the front chassis 420 and the liquid crystal panel 10. Furthermore, the third bonding member 73 may bond the middle mold 40 and the front chassis 420.

With the third bonding member 73, the front chassis 420 may be fixedly coupled to the middle mold 40 and further to the liquid crystal panel 10. The front chassis 420 may be coupled to the sides of the liquid crystal panel 10 and the middle mold 40 to prevent external foreign materials from being brought into the liquid crystal panel 10 or the middle mold 40.

In the embodiment of the disclosure, the front chassis 420 may be coupled to the sides of the liquid crystal panel 10 and the middle mold 40 by the third bonding member 73 without an extra fastening member. Accordingly, the front chassis 420 may not include the extra fastening member, and may thus have slim thickness as compared to a case of having a fastening member.

The front chassis 30 and the middle mold 40 may be coupled by the fastening member S. The fastening member S may pass through the first fastening hole 35 of the rear chassis 30 to be coupled to the fastening groove 46 of the middle mold 40.

Figure 9:
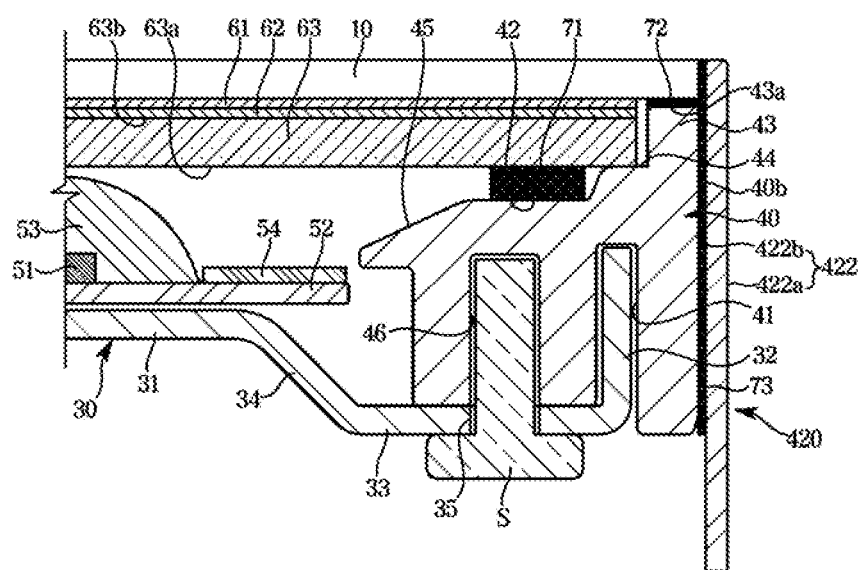
FIG. 9 is a side cross-sectional view of a display apparatus, according to another embodiment of the disclosure.

FIG. 9 is a side cross-sectional view of a display apparatus, according to another embodiment of the disclosure.

In the embodiment of the disclosure, the middle mold 140 may include the supporting projection 143, which may include the light reflecting plane 143*b*.

The light reflecting plane 143*b* may prevent portions of the edges of the liquid crystal panel 10 from having excessively high brightness. The light reflecting plane 143*b* may reduce an amount of light emitted through the edges of the liquid crystal panel 10 by reflecting the light backward. This may prevent relative increase of brightness of the portions of the edges of the liquid crystal panel 10, and accordingly, the liquid crystal panel 10 may have uniform brightness across the entire area.

Furthermore, the front chassis 420 may be coupled to the side of the liquid crystal panel 10 and the side of the middle mold 140 by the third bonding member 73 without an extra fastening member. Accordingly, the front chassis 420 may not include the extra fastening member, and may thus have slim thickness as compared to a case of having a fastening member.

The front chassis 230 and the middle mold 240 may be coupled by the fastening member S. The fastening member S may pass through the first fastening hole 235 of the rear chassis 30 to be coupled to the fastening groove 243 of the middle mold 240.

Figure 10:
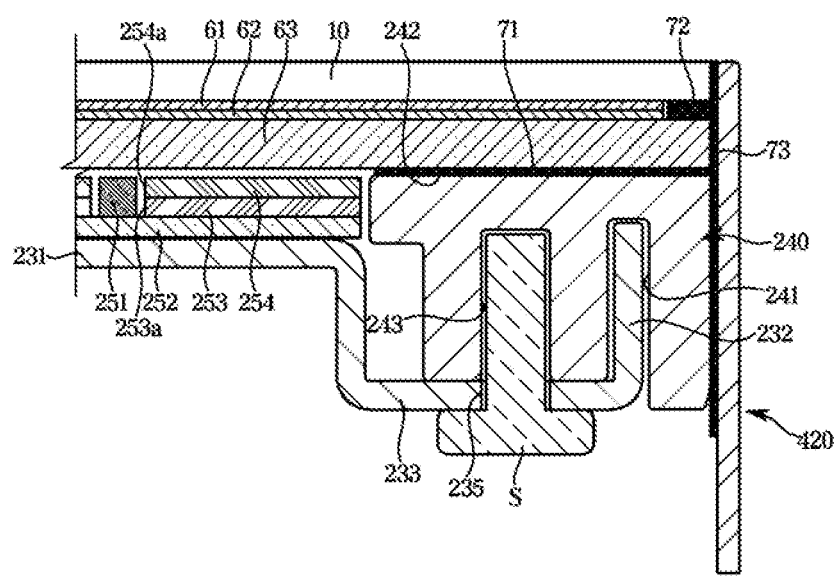
FIG. 10 is a side cross-sectional view of a display apparatus, according to another embodiment of the disclosure.

FIG. 10 is a side cross-sectional view of a display apparatus, according to another embodiment of the disclosure.

In the embodiment of the disclosure, the light source module 250 may not include a lens. Accordingly, a least distance required between the light source and the diffuser plate may be reduced as compared with an occasion when the lens is provided. Furthermore, a distance between a base 231 of the rear chassis 230 and the liquid crystal panel 10 may be reduced. With the reduced distance between the base 231 and the liquid crystal panel 10, thickness of the display apparatus from front to back may be reduced. With the reduced thickness of the display apparatus, the display apparatus may give an enhanced aesthetic impression.

In the embodiment of the disclosure, the middle mold 240 may include the sheet bonding surface 242. No projection may be provided on the sheet bonding surface 242. The first bonding member 71 may be provided between the sheet bonding surface 242 and the rear surface 63*a* of the diffuser plate 63. The first bonding member 71 may couple the middle mold 240 to the diffuser plate 63 by bonding the sheet bonding surface 242 and the rear surface 63*a* of the diffuser plate 63. The first bonding member 71 may include a pressure sensitive bonding member (PSA) or an optical clear bonding member (OCA).

In the embodiment of the disclosure, the liquid crystal panel 10 may be fixedly coupled to the diffuser plate 63. The second bonding member 72 may be provided between the liquid crystal panel 10 and the diffuser plate 63 to bond the liquid crystal panel 10 and the diffuser plate 63. Accordingly, the liquid crystal panel 10 may be fixedly coupled to the diffuser plate 63. The second bonding member 72 may include UV resin.

Although not shown, the liquid crystal panel 10 may be coupled to the first optical sheet 61. In this case, the second bonding member 72 may be arranged between the liquid crystal panel 10 and the first optical sheet 61.

In the embodiment of the disclosure, the liquid crystal panel 10 and the diffuser plate 63 may be coupled by the second bonding member 72 without an extra structure.

In the conventional display, an bonding member may be provided on a structure arranged at e.g., the front chassis to couple the liquid crystal panel to the front chassis. In such a method, it is difficult to form a liquid crystal panel supporting structure corresponding to the size of a black material (BM) of the ever decreasing liquid crystal panel.

In the embodiment of the disclosure, the second bonding member 72 may be placed in a size corresponding to the BM of the liquid crystal panel. Accordingly, even when the BM of the liquid crystal panel becomes smaller, the liquid crystal panel 10 may be stably coupled to the diffuser plate 63 or the first optical sheet 61 accordingly.

In the embodiment of the disclosure, the front chassis 420 may be coupled to the sides of the liquid crystal panel 10 by the third bonding member 73. Furthermore, the front chassis 420 may be coupled to the sides of the diffuser plate 63 by the third bonding member 73. Furthermore, the front chassis 420 may be coupled to the middle mold 240 by the third bonding member 73. The front chassis 420 may be coupled to the liquid crystal panel 63, the diffuser plate 63, and the middle mold 240 without an extra fastening member. The front chassis 420 may not include the extra fastening member, and may thus have slim thickness as compared to a case of having a fastening member.

The front chassis 230 and the middle mold 340 may be coupled by the fastening member S. The fastening member S may pass through the first fastening hole 235 of the rear chassis 30 to be coupled to the fastening groove 243 of the middle mold 240.

Figure 11:
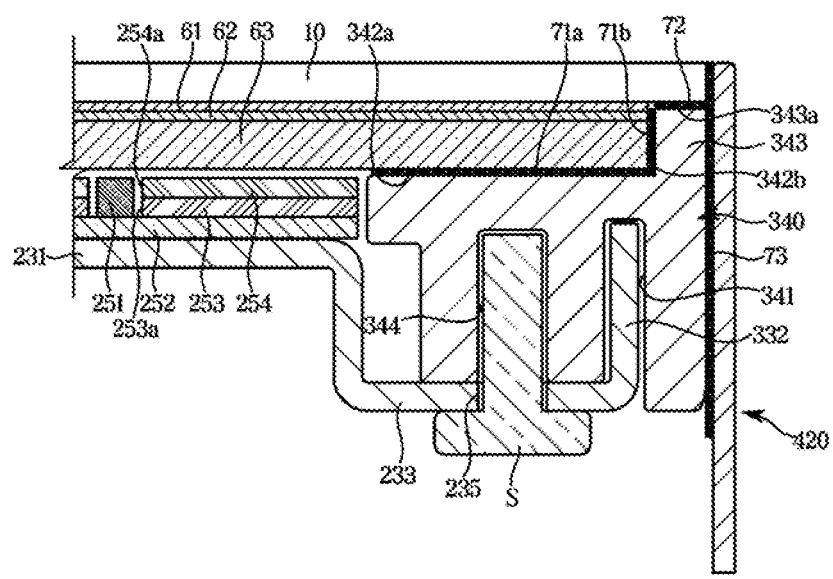
FIG. 11 is a side cross-sectional view of a display apparatus, according to another embodiment of the disclosure.

FIG. 11 is a side cross-sectional view of a display apparatus, according to another embodiment of the disclosure.

In the embodiment of the disclosure, the liquid crystal panel 10 may be fixedly coupled to a middle mold 340.

The middle mold 340 may include the supporting projection 343 protruding toward the liquid crystal panel 10. The supporting projection 343 may include a panel bonding surface 343a facing the rear surface of the liquid crystal panel 10. The second bonding member 72 may be provided between the panel bonding surface 343a and the rear surface of the liquid crystal panel 10. The second bonding member 72 may be provided to bond the panel bonding surface 343a of the middle mold 340 and the rear surface of the liquid crystal panel 10. With the second bonding member 72, the liquid crystal panel 10 may be fixedly coupled to the middle mold 340. The second bonding member 72 may include UV resin.

In the embodiment of the disclosure, the middle mold 340 may include the first sheet bonding surface 342a and the second sheet bonding surface 342b.

The first bonding surface 342a may be arranged to face the rear surface 63a of the diffuser plate 63 (see FIG. 4), and the bonding member 1a 71a may be placed between the first sheet bonding surface 342a and the rear surface 63a of the diffuser plate 63.

The second sheet bonding surface 342b may be arranged to face sides 63c of the diffuser plate 63. The bonding member 1b 71b may be provided between the second sheet bonding surface 342 and the side 63c of the diffuser plate 63.

The bonding member 1a 71a and the bonding member 1b 71b may include an PSA and an OCA.

In the embodiment of the disclosure, the sheet bonding surface may be double-sided to relatively strengthen adhesive power between the diffuser plate and the middle mold. Accordingly, the diffuser plate and the middle mold may be more stably coupled.

In the embodiment of the disclosure, the front chassis 420 may be coupled to the sides of the liquid crystal panel 10 by the third bonding member 73. Furthermore, the front chassis 420 may be coupled to the middle mold 340 by the third bonding member 73. The front chassis 420 may be coupled to the liquid crystal panel 63 and the middle mold 340 without an extra fastening member. The front chassis 420 may not include the extra fastening member, and may thus have slim thickness as compared to a case of having a fastening member.

In the embodiment of the disclosure, the front chassis 420 may be coupled to the sides of the liquid crystal panel 10 and the sides of the middle mold 340 by the third bonding member 73 without an extra fastening member. Accordingly, the front chassis 420 may not include the extra fastening member, and may thus have slim thickness as compared to a case of having a fastening member.

The front chassis 230 and the middle mold 340 may be coupled by the fastening member S. The fastening member S may pass through the first fastening hole 235 of the rear chassis 30 to be coupled to the fastening groove 344 of the middle mold 340.

Figure 12:
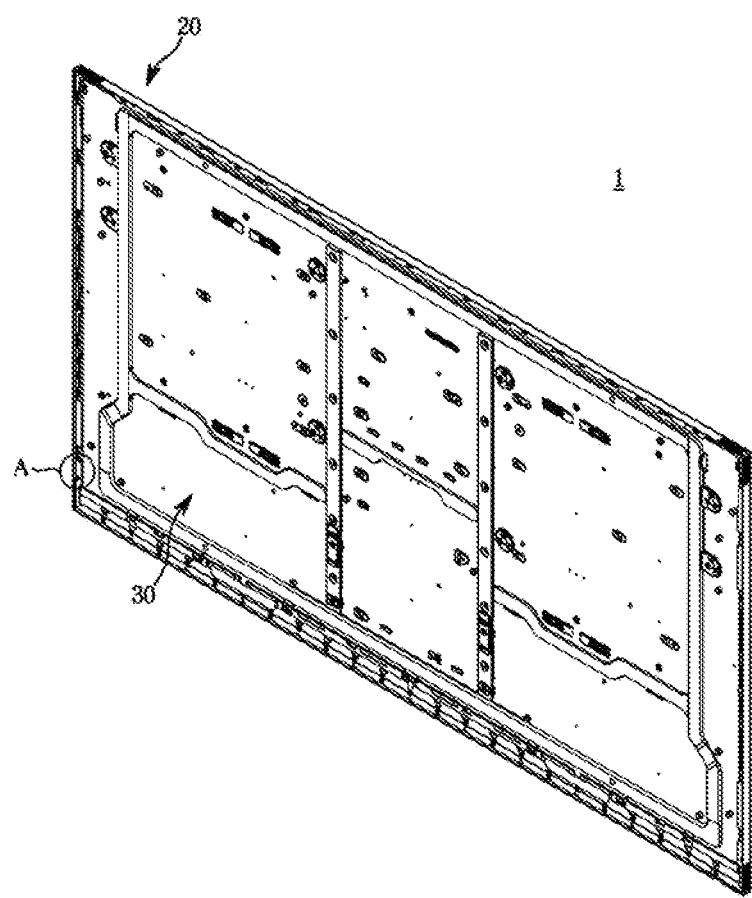
FIG. 12 is a rear perspective view of a display apparatus, according to an embodiment of the disclosure.
Figure 13:
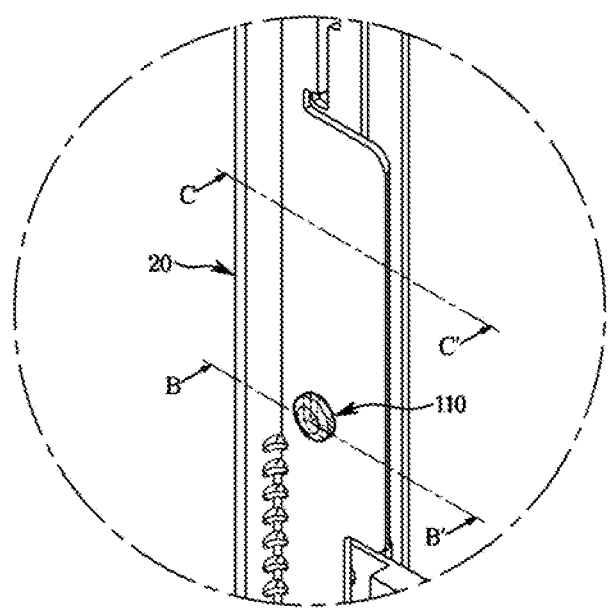
FIG. 13 is an enlarged view of portion A of FIG. 12.
Figure 14:
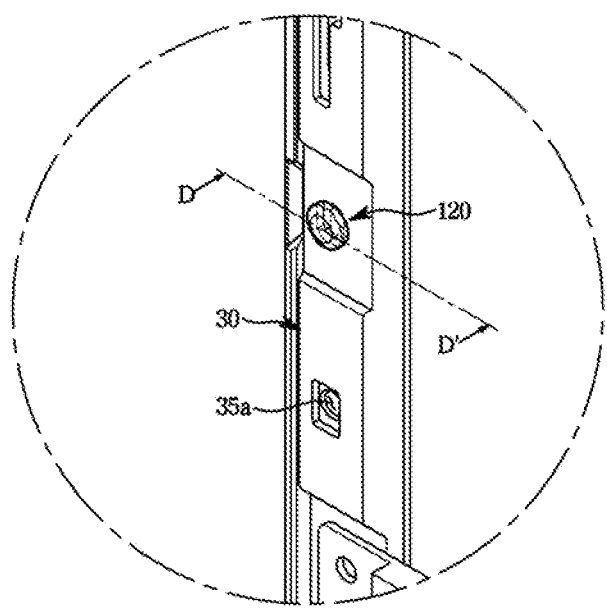
FIG. 14 illustrates a front chassis decoupled from what is shown in FIG. 13.

FIG. 12 is a rear perspective view of a display apparatus, according to an embodiment of the disclosure. FIG. 13 is an enlarged view of portion A of FIG. 12. FIG. 14 illustrates a front chassis decoupled from what is shown in FIG. 13.

Referring to FIGS. 12 to 14, in an embodiment of the disclosure, a display apparatus may include the light source module 50 installed therein, and the rear chassis 30 which covers the rear side of the light source module 50 and defines the rear side of the display apparatus.

In the embodiment of the disclosure, as described above, the liquid crystal panel 10 may be bonded to the middle mold 40 by the second bonding member 72. The optical members 61, 62 and 63 arranged to come into contact with the rear surface of the liquid crystal panel 10 may be bonded to the middle mold 40 by the first bonding member 71. This was described above, so the overlapping description will not be repeated.

According to the disclosure, the liquid crystal panel 10 may be bonded to the middle mold 40 or the first optical sheet 61, and the optical members 61, 62 and 63 may be bonded to the middle mold 40. Such bonding of the liquid crystal panel 10 to the middle mold 40 or the first optical sheet 61 may be irreversible. Similarly, the bonding of the optical members 61, 62 and 63 to the middle mold 40 may be irreversible.

In the case that the bonding of the liquid crystal panel 10 to the middle mold 40 or the first optical sheet 61 is irreversible, it is not possible to detach the liquid crystal panel 10 from the front of the display apparatus 1. It is because the liquid crystal panel 10 is very likely to be damaged in the process of decoupling of the liquid crystal panel 10.

For various reasons, internal parts of the display apparatus, i.e., the light source module 50, needs to be accessed. For example, when a portion of the light source module 50 is to be replaced or a foreign material is brought into the display device, there is a need for a structure in which the light source module 50 is detachable from the display apparatus.

As described above, when the liquid crystal panel 10 is bonded to the middle mold 40 or the optical members 61, 62, and 63 and this bonding is irreversible, it is difficult to access the light source module 50 by detaching the liquid crystal panel 10 from the front of the display apparatus.

According to the disclosure, the light source module 50 and the rear chassis 30 at which the light source module 50 is installed may be decoupled from behind the display apparatus 1.

Referring to FIG. 13, at least a portion of the front chassis 20 may be placed on the rear side of the display apparatus 1. A fixing hole 23 (see FIG. 15) may be formed at the front chassis 20 to fasten the front chassis 20 to the rear chassis 30 and/or the middle mold 40. A first fastening member 110 may be inserted to the fixing hole 23.

The first fastening member 110 may include a first fastening portion 111 having a diameter smaller than a diameter of the fixing hole 23 to pass through the fixing hole 23, and a first head portion 112 having a diameter larger than the diameter of the fixing hole 23 not to pass the fixing hole 23.

As shown in FIG. 13, the first head portion 112 may be placed outside the fixing hole 23, i.e., on the outside of the front chassis 20. With various tools not shown in the drawings, the user may detach the first fastening member 110 exposed on the rear side of the display apparatus from behind the display apparatus.

Referring to FIG. 14, the front chassis 20 may be decoupled from the display apparatus by detaching the first fastening member 110. As the front chassis 20 is coupled to the rear chassis 30 and the middle mold 40 by the first fastening member 110, decoupling of the first fastening member 110 may allow the front chassis 20 to be decoupled from the rear chassis 30 and the middle mold 40. FIG. 14 illustrates decoupling of the front chassis 20.

Referring to FIG. 14, a fastening hole 35 may be formed at the rear chassis 30, and the second fastening member 120 may be coupled to the fastening hole 35.

The second fastening member 120 may include a second fastening portion 121 having a diameter smaller than a diameter of the fastening hole 35 to pass through the fastening hole 35, and a second head portion 122 having a diameter larger than the diameter of the fastening hole 35 not to pass the fastening hole 35.

As shown in FIGS. 13 and 14, even when the front chassis 20 is decoupled from the display apparatus by detaching the first fastening member 110, the rear chassis 30 may still be in a state of being coupled to the middle mold 40. The second fastening member 120 may pass through the fastening hole 35 formed at the rear chassis 30 to be coupled to the fastening groove 46 of the middle mold 40. As the second fastening member 120 couples the rear chassis 30 to the middle mold 40, the rear chassis 30 may be coupled to the middle mold 40 even when the first fastening member 110 and the front chassis 20 are decoupled. Hence, to detach the rear chassis 30 and the light source module 50 installed at the rear chassis 30 from the middle mold 40, not only the first fastening member 110 but also the second fastening member 120 need to be decoupled.

Figure 15:
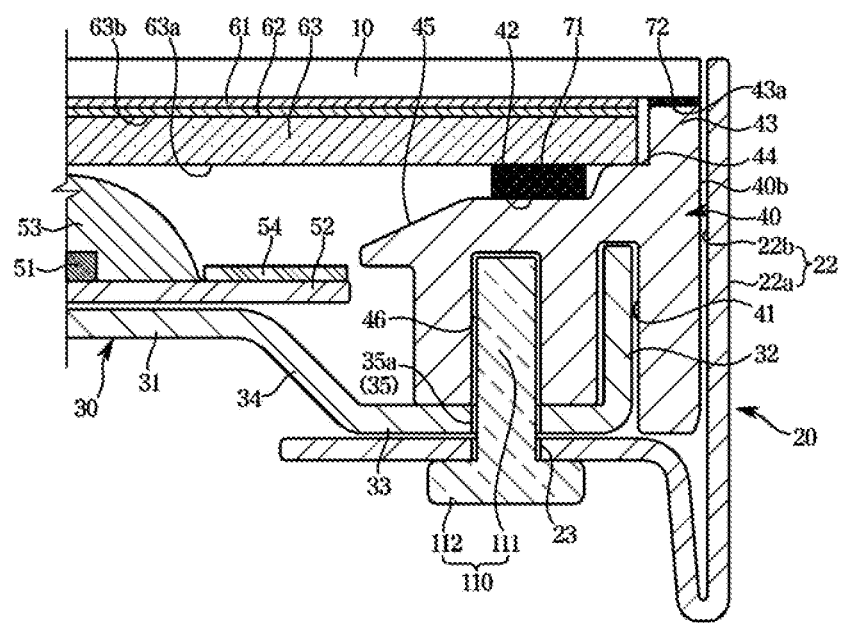
FIG. 15 is a cross-sectional view along line B-B' of FIG. 12.
Figure 16:
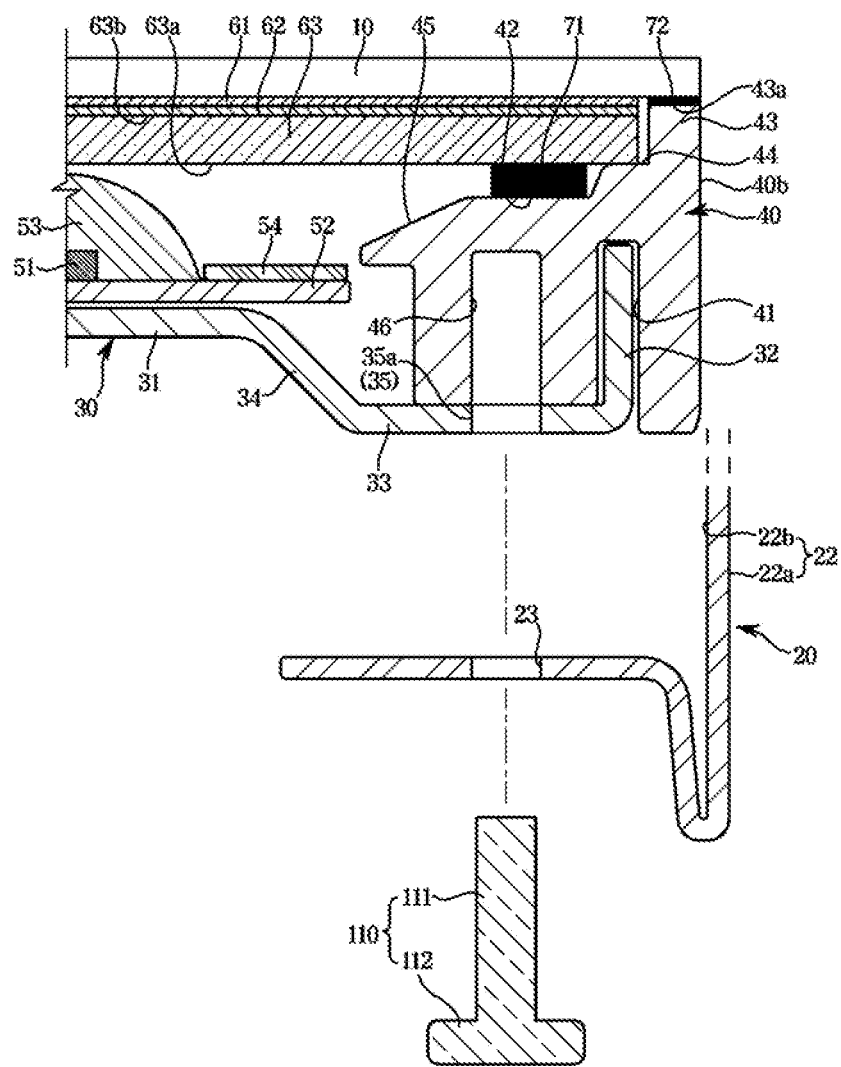
FIG. 16 illustrates decoupling of a front chassis from what is shown in FIG. 15.
Figure 17:
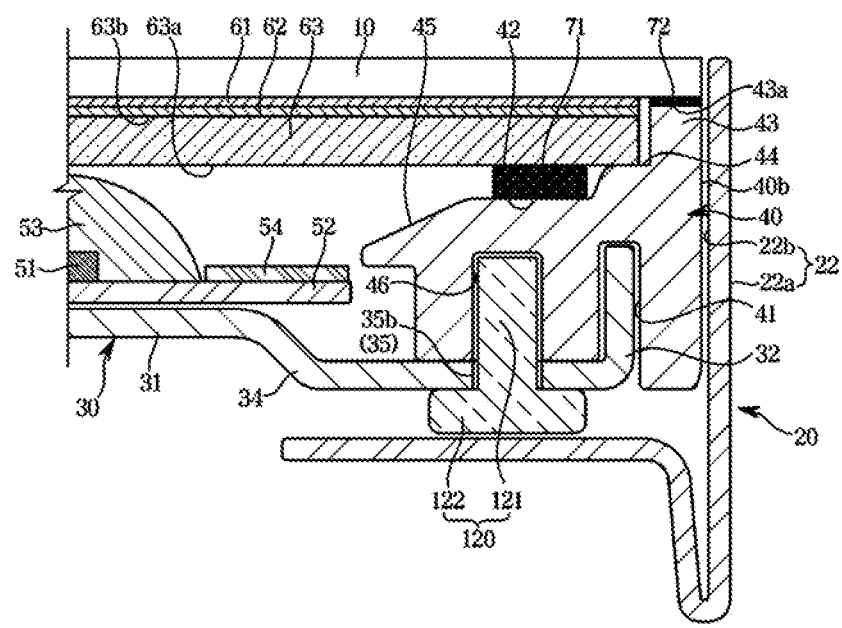
FIG. 17 is a cross-sectional view along line C-C' of FIG. 12.
Figure 18:
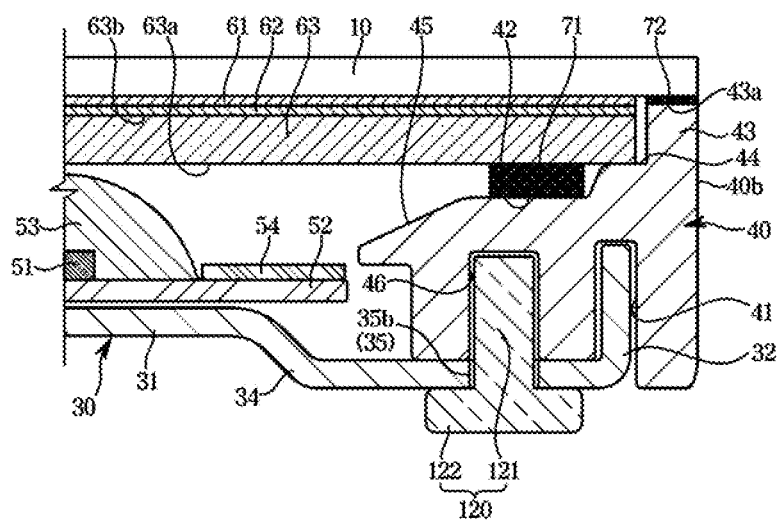
FIG. 18 is a cross-sectional view along line D-D' of FIG. 13.
Figure 19:
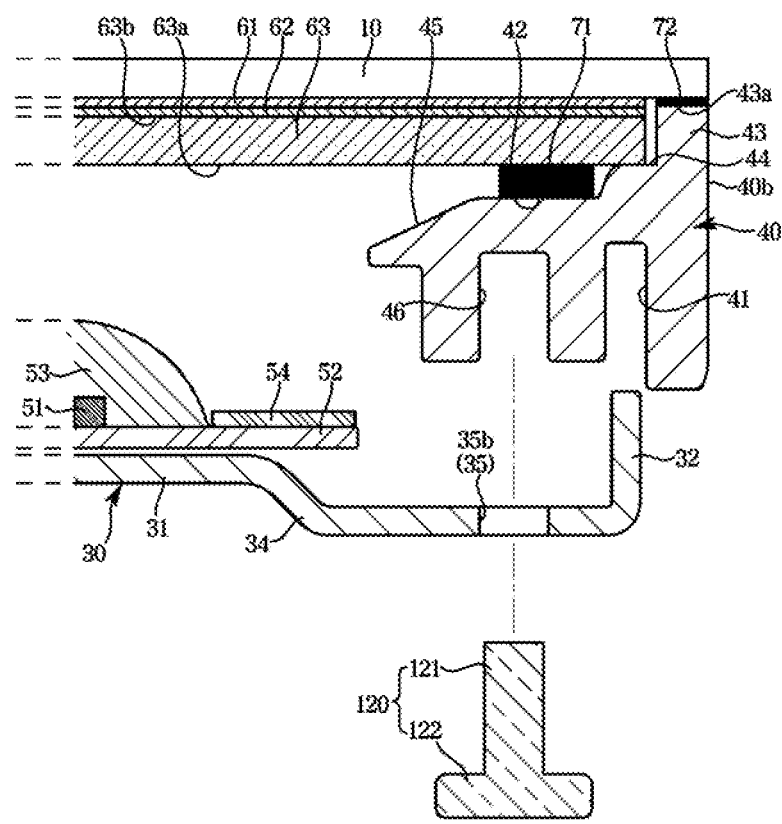
FIG. 19 illustrates decoupling of a rear chassis and a light source module from what is shown in FIG. 18.

FIG. 15 is a cross-sectional view along line A-A' of FIG. 12. FIG. 16 is a cross-sectional view along line C-C' of FIG. 13. FIG. 17 is a cross-sectional view along line B-B' of FIG. 12. FIG. 18 is a cross-sectional view along line D-D' of FIG. 13. FIG. 19 illustrates decoupling of a rear chassis and a light source module from what is shown in FIG. 18.

Referring to FIGS. 15 to 19, the coupling structure of the disclosure will be described in detail.

Referring to FIGS. 15 and 19, the rear chassis 30 may include a fastening hole 35. The fastening hole 35 may include a first fastening hole 35a matching the fastening groove 46 and the fixing hole 23. The fastening hole 35 may include a second fastening hole 35b matching the fastening groove 46 and covered by the front chassis 20.

The fastening member may include the first fastening member 110 arranged to pass through the fixing hole 23 and the first fastening hole 35a to be inserted to the fastening groove 46, and the second fastening member 120 arranged to pass through the second fastening hole 35b to be inserted to the fastening groove 46.

The first fastening member 110 may be placed such that the first head portion 112 is placed on the outside of the front chassis 20, as described above. The first head portion 112 may then be exposed on the rear side of the display apparatus so that the user may have access to the first fastening member 110 without any particular measure. Accordingly, the first fastening member 110 may be decoupled from the display apparatus 1.

Once the first fastening member 110 is decoupled, constraints on the front chassis 20 may be removed. As shown in FIG. 16, decoupling of the first fastening member 110 may allow the front chassis 20 to be decoupled from the display apparatus 1.

Referring to FIG. 17, the second head portion 122 of the second fastening member 120 may be covered by the front chassis 20. The second head portion 122 may be arranged between the rear chassis 30 and the front chassis 20. As the second head portion 122 is covered by the front chassis 20, the second fastening member 120 may not be exposed to the outside before the front chassis 20 is decoupled from the display apparatus 1. This is to prevent the user from detaching the second fastening member 120 before the first fastening member 110. When the first fastening member 110 is detached after the second fastening member 120 is detached first, the rear chassis 30 and the front chassis 20 may be simultaneously decoupled from the display apparatus 1. In this process, the rear chassis 30 and the light source module 50 mounted on the rear chassis 30 might fall to the ground and might be broken. Hence, it is desirable that the front chassis 20 covers the second fastening member 120, without being limited thereto.

Referring to FIG. 18, even when the first fastening member 110 and the front chassis 20 are detached, the rear chassis 30 may still be in a state of being coupled to the middle mold 40. It is because the second fastening member 120 couples the rear chassis 30 to the middle mold 40.

Referring to FIG. 19, the rear chassis 30 and the light source module 50 installed at the rear chassis 30 may be decoupled from behind the display apparatus 1 by detaching the second fastening member 120. As described above, in a case of having a structure difficult to detach the liquid crystal panel 10 from the front, the light source module 50 may be accessed from behind the display apparatus 1 by detaching the first fastening member 110 and the second fastening member 120.

The detached light source module 50 may be reassembled in the opposite order of the aforementioned procedure, and it is advantageous that the light source module 50 may be replaced or internal parts of the display apparatus 1 may be accessed without forcing to remove the bonding members 71 and 72.

In FIGS. 15 to 19, the second bonding member 72 is shown as being arranged between the middle mold 40 and the liquid crystal panel 10 for example, but it is not limited thereto. The aforementioned coupling and decoupling structures may be applied to the various embodiments shown in FIGS. 3 to 7.

Figure 20:
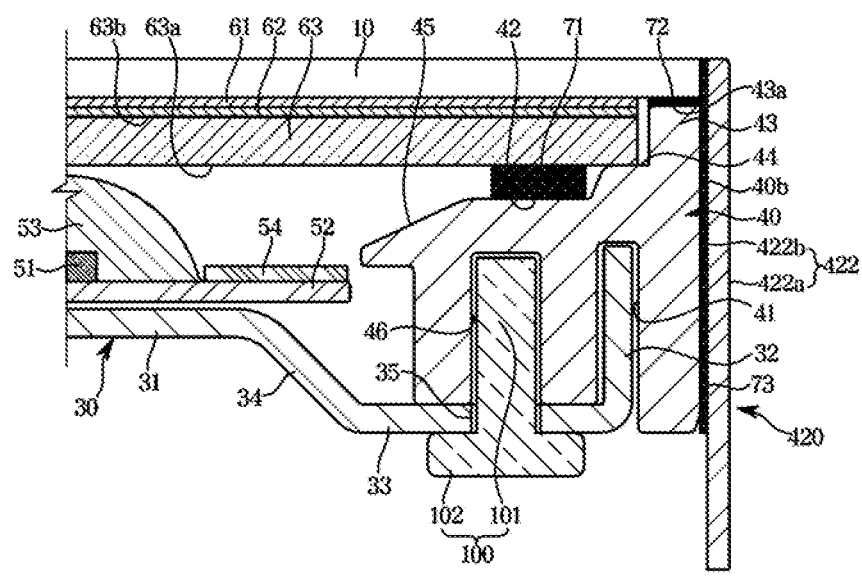
FIG. 20 is a cross-sectional view of a display apparatus, according to another embodiment of the disclosure.
Figure 21:
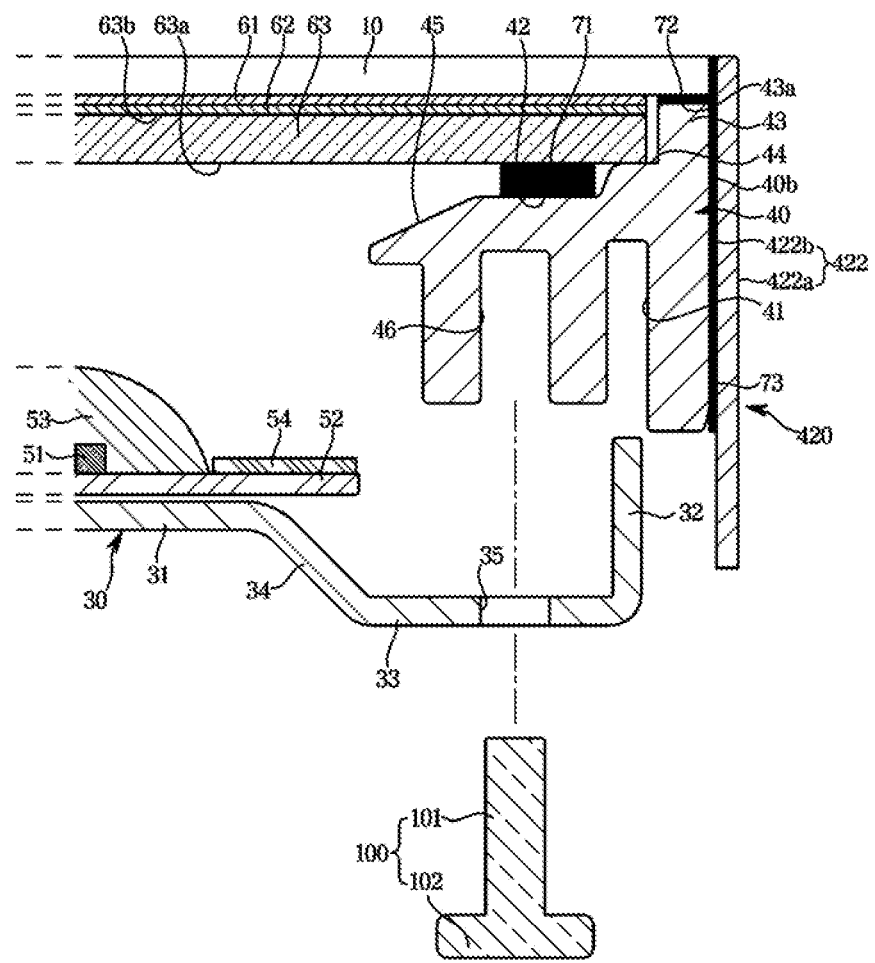
FIG. 21 illustrates decoupling of a rear chassis and a light source module from what is shown in FIG. 20.

FIG. 20 is a cross-sectional view of a display apparatus, according to another embodiment of the disclosure. FIG. 21 illustrates decoupling of a rear chassis and a light source module from what is shown in FIG. 20.

Referring to FIGS. 20 and 21, the front chassis 420 may not be coupled to the rear chassis 30 and the middle mold 40 by the fastening member 100. The front chassis 420 may be coupled to the side of the middle mold 40 by the third bonding member 73. Coupling between the front chassis 420 and the middle mold 40 by the third bonding member 73 may be irreversible. In this case, the rear chassis 30 and the light source module 50 installed at the rear chassis 30 may be decoupled from behind the display apparatus 1 by detaching the fastening member 100 from the rear chassis 30. Even when the rear chassis 30 and the light source module 50 are detached, the front chassis 420 may not be decoupled from the middle mold 40 but coupled to the middle mold 40.

In another embodiment of the disclosure, the rear chassis 30 and the light source module 50 may be decoupled from behind the display apparatus without detaching the front chassis 420.

Furthermore, in FIGS. 20 and 21, the second bonding member 72 is shown as being arranged between the middle mold 40 and the liquid crystal panel 10 for example, but it is not limited thereto. The aforementioned coupling and decoupling structures may be applied to the various embodiments shown in FIGS. 8 to 11.

Several embodiments of the disclosure have been described above, but a person of ordinary skill in the art will understand and appreciate that various modifications can be made without departing from the scope of the disclosure. Thus, it will be apparent to those or ordinary skill in the art that the true scope of technical protection is only defined by the following claims.

What is claimed is:

1. A display apparatus comprising:
   a rear chassis including a base, a middle mold supporter with a fastening hole, a link connectable to a first edge of the middle mold supporter and a bent portion at a second edge of the middle mold supporter, opposite the first edge, extending from the middle mold supporter such that the fastening hole of the middle mold supporter is between the link and the bent portion while the link is connected to the first edge of the middle mold supporter;
   a light source module, installed on the base, and configured to emit light;
   a diffuser plate to diffuse light emitted from the light source module;
   a liquid crystal panel, arranged in front of the diffuser plate, and configured to display an image;
   a front chassis arranged to cover sides of the liquid crystal panel and the diffuser plate;
   a middle mold to couple the diffuser plate so that the diffuser plate is arranged in front of the light source module, the middle mold being supportable by the middle mold supporter of the rear chassis, and the middle mold including:
      a fastening groove that aligns with the fastening hole of the middle mold supporter of the rear chassis while the middle mold supporter of the rear chassis is between a portion of the front chassis and the middle mold is supported by the middle mold supporter of the rear chassis, and
      an insertion groove in which the bent portion of the rear chassis is insertable while the fastening groove is aligned with the fastening hole of the rear chassis;
   a bonding member arranged between the middle mold and the diffuser plate to bond the diffuser plate to the middle mold; and
   a fastening member to couple the rear chassis to the middle mold while the fastening member is coupled to the fastening groove of the middle mold by passing through the fastening hole of the rear chassis from behind the rear chassis and the bent portion of the rear chassis is inserted into the insertion groove of the middle mold,
   wherein the link slantingly extends backward from an end of the base to connect to the first edge of the middle mold supporter.

2. The display apparatus of claim 1, wherein the portion of the front chassis comprises a fixing hole arranged to align with the fastening hole of the rear chassis and the fastening groove of the middle mold, and the fastening member passes through the fixing hole of the front chassis to couple the rear chassis to the middle mold.

3. The display apparatus of claim 2, further comprising:
   a first fastening hole to align with the fastening groove of the middle mold and the fixing hole of the front chassis, and
   a second fastening hole to align with the fastening groove of the middle mold and covered by the front chassis.

4. The display apparatus of claim 3, wherein the fastening member comprises:
   a first fastening member to be coupled to the fastening groove by passing through the fixing hole and the first fastening hole to couple the front chassis and rear chassis to the middle mold, and
   a second fastening member to be coupled to the fastening groove by passing through the second fastening hole to couple the rear chassis to the middle mold.

5. The display apparatus of claim 4, wherein the fastening member comprises:
   a fastening portion arranged to be inserted and coupled to the fastening groove, and
   a head portion having a diameter larger than a diameter of the fastening groove.

6. The display apparatus of claim 5, wherein the first fastening member comprises a first head portion, and
   wherein the first head portion is outside of the front chassis while the front chassis and rear chassis couple to the middle mold.

7. The display apparatus of claim 5, wherein the second fastening member comprises a second head portion, and the second head portion is between the rear chassis and the front chassis and covered by the front chassis.

8. The display apparatus of claim 4, wherein the front chassis is decoupled from the display apparatus by detaching the first fastening member from the middle mold.

9. The display apparatus of claim 8, wherein the rear chassis and the light source module installed at the rear chassis are decoupled from the display apparatus by detaching the first fastening member from the middle mold and detaching the second fastening member from the middle mold.

10. The display apparatus of claim 1, further comprising:
    a chassis bonding member arranged between the front chassis and the middle mold to bond the front chassis to the middle mold.

11. The display apparatus of claim 10, wherein the rear chassis and the light source module installed at the rear chassis are decoupled from the display apparatus by detaching the fastening member from the middle mold.

12. The display apparatus of claim 1, further comprising:
    a panel bonding member arranged between the liquid crystal panel and the middle mold to bond the liquid crystal panel to the middle mold.

13. The display apparatus of claim 12, wherein the panel bonding member comprises ultraviolet (UV) resin applied in a liquid state and hardened by a UV ray.

14. The display apparatus of claim 1, wherein outermost sides of the middle mold are coplanar with sides of the liquid crystal panel, or located father inside than the sides of the liquid crystal panel.

* * * * *